United States Patent [19]

Ishii

[11] Patent Number: 4,881,627
[45] Date of Patent: Nov. 21, 1989

[54] CONTROL SYSTEM FOR AUTOMOTIVE TRANSMISSION ARRANGEMENT INCLUDING LOCK-UP CLUTCH

[75] Inventor: Shigeru Ishii, Atsugi, Japan

[73] Assignee: Nissan Motor Co., Ltd., Yokohama, Japan

[21] Appl. No.: 185,407

[22] Filed: Apr. 25, 1988

[30] Foreign Application Priority Data

Jun. 26, 1987 [JP] Japan ................................ 62-160423

[51] Int. Cl.$^4$ ............................................. F16H 45/02
[52] U.S. Cl. ................................ 192/0.076; 192/3.31
[58] Field of Search .............. 74/877; 192/0.076, 3.31, 192/3.3; 364/424.1

[56] References Cited

U.S. PATENT DOCUMENTS

| 4,456,107 | 6/1984 | Ito et al. | 192/0.076 X |
| 4,730,709 | 3/1988 | Kawata et al. | 192/3.31 |
| 4,730,712 | 3/1988 | Ohkumo | 192/0.076 |
| 4,760,761 | 8/1988 | Nishikawa et al. | 192/0.076 X |

FOREIGN PATENT DOCUMENTS 3619671 12/1986 Fed. Rep. of Germany ... 192/0.076

OTHER PUBLICATIONS

Nissan Automatic Transaxle Service Manual for the Re4R01A Type Transmission (published Mar. 1987; pp. I 28–I 29).

Primary Examiner—Rodney H. Bonck
Attorney, Agent, or Firm—Foley & Lardner, Schwartz, Jeffery, Schwaab, Mack, Blumenthal & Evans

[57] ABSTRACT

In order to accurately detect an engine or prime mover entering an idling state the position and rate of movement of a control element (such as an engine throttle valve) which varies with the load or torque produced is monitored. If the rate of movement is found to be sequentially within two ranges, the second of which is narrower than the first, and the control element is close to its minimum torque indicative position, a control signal is issued to release a transmission lock-up clutch or the like device which is associated with the engine.

11 Claims, 4 Drawing Sheets

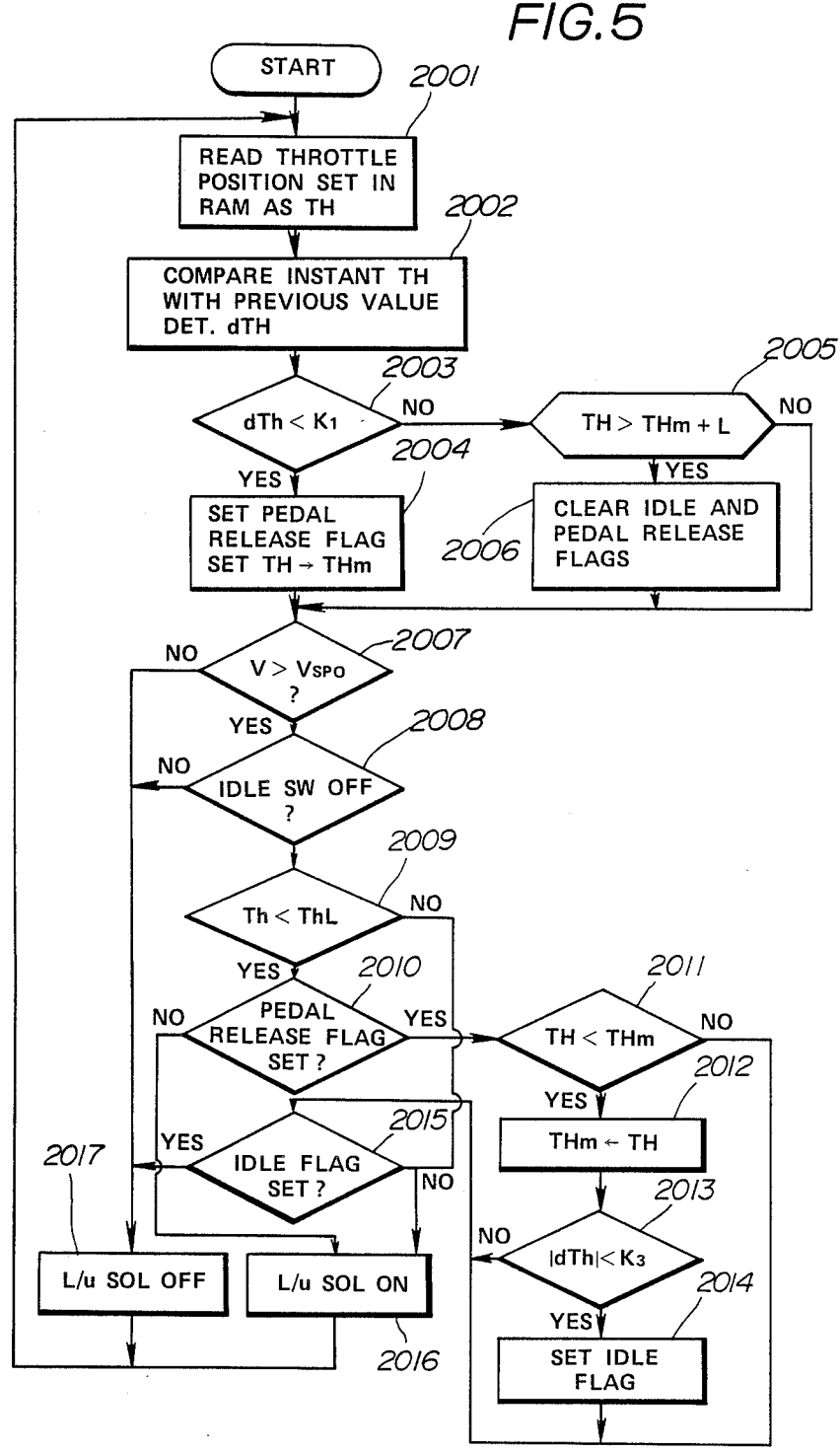

CONTROL SYSTEM FOR AUTOMOTIVE TRANSMISSION ARRANGEMENT INCLUDING LOCK-UP CLUTCH

BACKGROUND OF THE INVENTION

1. Field of the invention

The present invention relates generally to automotive transmissions and more specifically to an improved control arrangement for a transmission system having a lock-up clutch associated with the torque converter of the system.

2. Description of the Prior Art

NISSAN AUTOMATIC TRANSAXLE SERVICE MANUAL - for the RE4R01A type transmission (published in March 1987) discloses in section I page 28 to 29 an example of a transmission system of the type wherein a lock-up clutch associated with the torque converter is controlled by an arrangement wherein a fully closed throttle condition is detected using the output of an idle switch. The output of this switch is used in combination with a vehicle speed indicative signal in a manner wherein, when the vehicle speed is above a predetermined level and the idle switch is OFF, a control solenoid is energized in a manner which induces lock-up clutch engagement and provides a positive drive connection between the engine (prime mover) and the transmission per se in all foward gears. When the vehicle speed is below the above mentioned level and the idle switch is ON, the control solenoid is de-energized and the lock-up clutch is released to permit torque multiplication by the torque converter.

However, this arrangement has suffered from the drawback that as the throttle valve is operatively connected with devices such as dashpots, choke controls and the like to prevent excessively rapid closure and/or keep the throttle valve opened by a predetermined amount, it sometimes occurs that even though the driver has released the accelerator pedal, the throttle valve does not synchronously assume a closed position in the throttle chamber. This leads to the situation wherein the idle switch does not close and indicate the change in demand, and prevents the lock-up control solenoid from being appropriately de-energized. This results in an undesirable shuddering phenomenon being produced particularly at high vehicle speeds wherein sudden vehicle deceleration is induced.

SUMMARY OF THE INVENTION

It is an object of the present invention to provide a control arrangement for an automotive transmission or the like, which accurately determines the load on the prime mover having entered an idling condition and which improves the reliability with which the control of devices such as lock-up clutches and the like can be executed.

In brief, the above object is achieved by an arrangement wherein the position and rate of movement of a control element (such as an engine throttle valve) which varies with the load or torque produced is monitored. If the rate of movement is found to be sequentially within two ranges, the second of which is narrower than the first, and the control element is close to its minimum torque indicative position, a control signal is issued to release a transmission lock-up clutch or the like device which is associated with the engine.

More specifically, a first aspect of the present invention comes in the form of a method of operating a system having a prime mover and a device associated with the prime mover, the method featuring the steps of: sensing the load on the prime mover; determining the rate at which the load is changing; sensing if the rate at which load is changing is within a first range; sensing, in response to the rate being sensed as being within the first range, if the rate is within a second predetermined range which is narrower than the first range; issuing a control signal to the device in the event that the rate at which load on the prime mover is changing is sequentially sensed as being within the first and second ranges.

A second aspect of the present invention comes in the form of a method of operating a system having a prime mover and a device associated with the prime mover, the method featuring the steps of: sensing the torque produced by the prime mover; determining the rate at which the torque is changing; sensing if the rate at which torque is changing is within a first range; sensing, in response to the rate being sensed as being within the first range, if the rate is within a second predetermined range which is narrower than the first range; issuing a control signal to the device in the event that the rate at which torque on the prime mover is changing is sequentially sensed as being within the first and second ranges.

A third aspect of the invention takes the form of a method of operating an automotive transmission having a torque converter and a lock-up clutch associated with the torque converter, the torque converter being operatively connected with a prime mover, the method featuring the steps of: sensing a first parameter which is indicative of one of (a) the load on the prime mover and (b) the torque produced by the prime mover; determining the rate at which the first parameter is changing; sensing if the rate at which the first parameter is changing is within a first range; sensing, in response to the rate being sensed as being within the first range, if the rate is within a second predetermined range which is narrower than the first range; issuing a control signal which releases the lock-up clutch in the event that the rate at which first parameter on the prime mover is changing is sequentially sequenced as being within the first and second ranges.

A fourth aspect of the invention takes the form of a system having a prime mover and a device associated with the prime mover, the system featuring: a unit for sensing the load on the prime mover; a unit for determining the rate at which the load is changing; a unit for sensing if the rate at which load is changing is within a first range; a unit for sensing, in response to the rate being sensed as being within the first range, if the rate is within a second predetermined range which is narrower than the first range; a unit for issuing a control signal to the device in the event that the rate at which load on the prime mover is changing is sequentially sensed as being within the first and second ranges.

A fifth aspect of the present invention comes in the form of a system having a prime mover and a device associated with the prime mover, the system featuring: a unit for sensing the torque produced by the prime mover; a unit for determining the rate at which the torque is changing; a unit for sensing if the rate at which torque is changing is within a first range; a unit for sensing, in response to the rate being sensed as being within the first range, if the rate is within a second predetermined range which is narrower than the first range; a unit for issuing a control signal to the device in the event that the rate at which torque on the prime mover is changing is sequentially sensed as being within the first and second ranges.

A sixth embodiment of the present invention takes the form of an automotive transmission having a torque converter and a lock-up clutch associated with the torque converter, the torque converter being operatively connected with a prime mover, the transmission featuring: a unit for sensing a first parameter which is indicative of one of (a) the load on the prime mover and (b) the torque produced by the prime mover; a unit for determining the rate at which the first parameter is changing; a unit for sensing if the rate at which first parameter is changing is within a first range; a unit for sensing, in response to the rate being sensed as being within the first range, if the rate is within a second predetermined range which is narrower than the first range; a unit for issuing a control signal which releases the lock-up clutch in the event that the rate at which first parameter on the prime mover is changing is sequentially sequenced as being within the first and second ranges.

A seventh embodiment of the present invention comes in the form of a system which includes: an internal combustion engine; a transmission; a clutch arrangement interconnecting the engine and the transmission, the clutch unit including a torque converter and a lock-up clutch; and a control arrangement for selectively controlling the lock-up clutch, the control arrangement comprising: a sensor for sensing a parameter which varies with one of (a) the torque produced by the engine and (b) the load on the engine; a sensor for sensing the rotational speed of the transmission; a circuit responsive to the first and second sensors for selectively producing a lock-up control signal, the circuit including units for: sensing the magnitude of the parameter; determining the rate at which the parameter magnitude is changing; sensing if the rate at which the parameter magnitude is changing is within a first range; sensing, in response to the rate being sensed as being within the first range, if the rate is within a second predetermined range which is narrower than the first range; issuing a control signal to the control arrangement which controls the lock-up clutch in the event that the rate at which the parameter magnitude is changing is sequentially sensed as being within the first and second ranges; sensing the magnitude of the parameter being below a predetermined minimum value; and preventing the issuance of the control signal while the magnitude of the parameter is above the predetermined minimum value.

BRIEF DESCRIPTION OF THE DRAWINGS

FIG. 5 is a flow chart showing the control steps which characterize a second embodiment of the present invention.

DETAILED DESCRIPTION OF THE PREFERRED EMBODIMENTS

Figure 1:
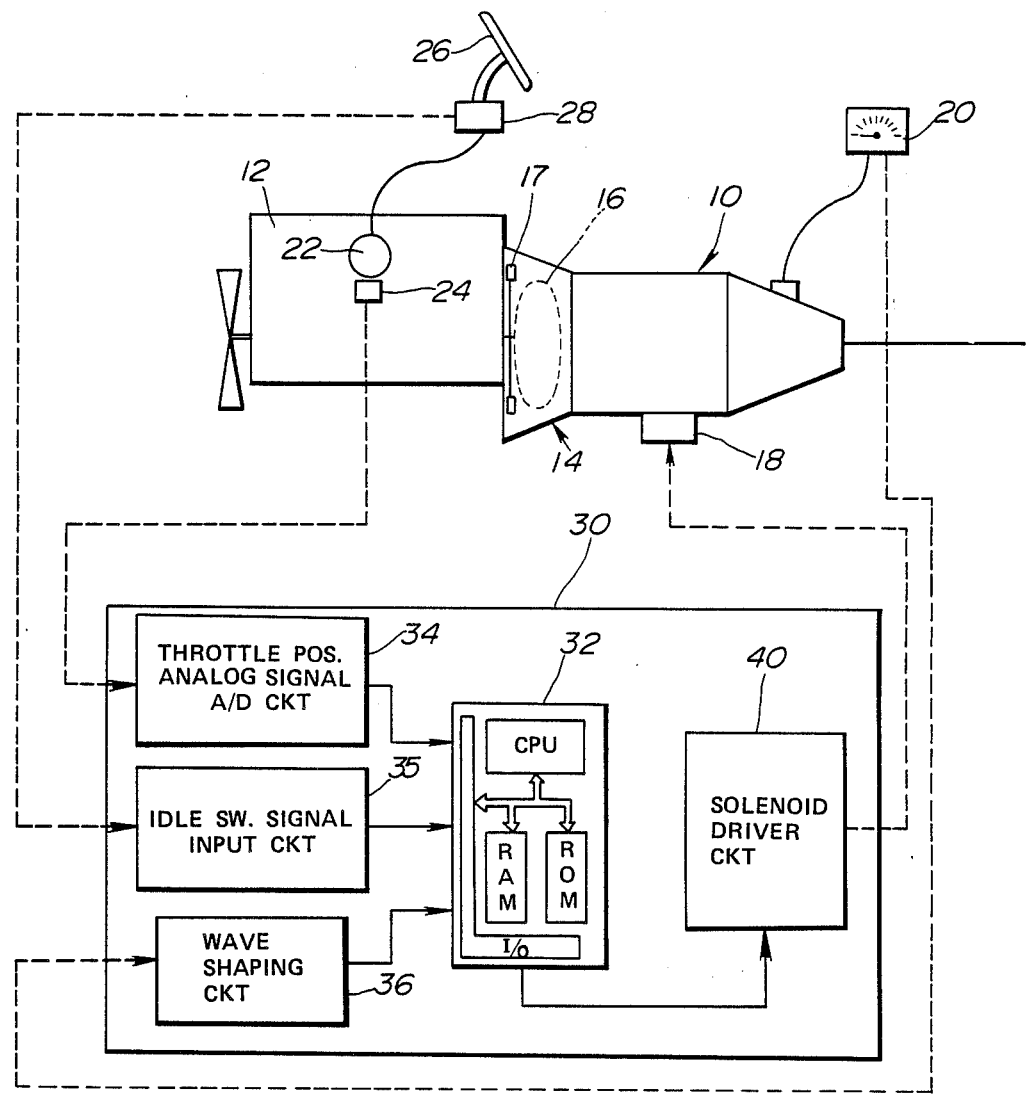
FIG. 1 is a schematic layout showing a system to which the embodiments of the present invention are applied.

FIG. 1 shows a system to which the embodiments of the present invention are applied. In this arrangement an automatic transmission 10 is operatively connected to a prime mover 12 (an internal combustion engine) by clutch unit 14. In this instance the clutch unit 14 includes a torque converter 16 and lock-up clutch unit 17. The transmission 10 is provided with a lock-up control solenoid 18 which when energized induces the lock-up clutch 17 to become engaged and which when de-energized permits the lock-up clutch 17 to disengage and permit the torque converter 16 to freely multiply the torque supplied by the engine 12. The transmission further includes a device 20 responsive to the rotational speed of the transmission output shaft and which produces a signal indicative of the vehicle speed.

The engine includes a throttle valve 22 and a throttle valve position sensor 24. In this instance the sensor produces an analog signal which varies with the opening degree of the throttle valve 22. The position of the throttle valve 22 is controlled by a manually operable member which in this case take the form of an accelerator pedal 26. An idle switch 28 is operatively connected with the throttle valve 22 (in this instance schematically illustrated with the accelerator pedal 26) and arranged to close and produce a high level output when the driver permits the accelerator pedal to assume a "fully released" position.

A control circuit 30 is arranged to receive the outputs from the sensors 20, 24 and 28 and to selectively energize the control solenoid 18 in accordance therewith. In this instance the control circuit incudes a microprocessor 32 which receives data input by way of circuits 34–36. As shown, these circuit are operatively interposed between the sensors 20, 24 and 28 in the illustrated manner.

The ROM of the microprocessor 32 includes control programs which monitor the changes in the data input and induce a solenoid driver circuit 40 to produce a suitable signal via which the lock-up solenoid 18 is energized.

Figure 3:
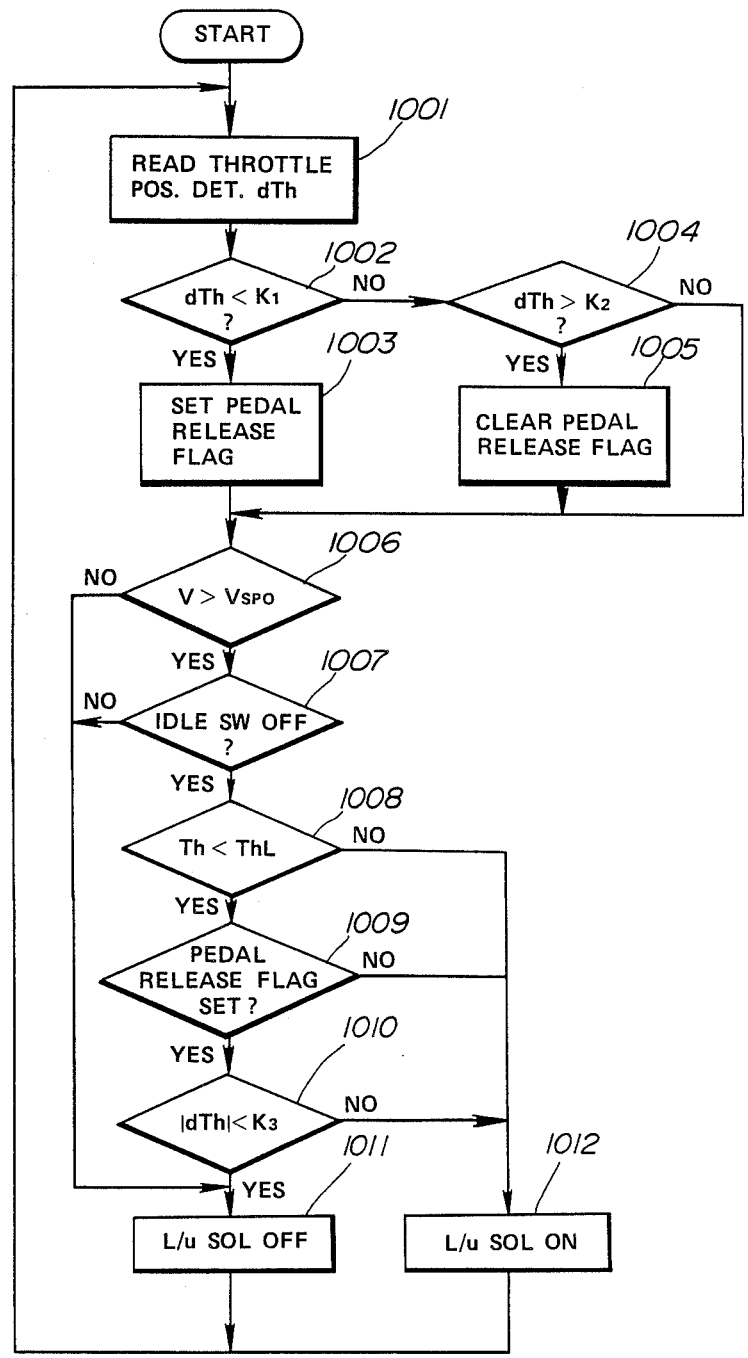
FIG. 3 is a flow chart showing the steps which characterize the operation provided by a first embodiment of the present invention.

FIG. 3 shows in flow chart form, the control provided in accordance with a first embodiment of the present invention. In this embodiment the instant throttle position TH is read and set in RAM (step 1001). This value is then compared with the previously recorded value and the difference determined. As will be understood as the nature of the program is such that each throttle position reading will be updated at essentially equidistantly spaced time intervals and as such the difference between two values can be taken as being indicative of the rate of change of position (viz., the first derivative of position dTh). After dTh is determined the old position value is updated ready for the next run.

During the period the idle switch 28 is not closed there are two possibilities. One, the throttle valve 22 is being selectively controlled, and two the throttle valve 22 has been released and is being temporarily prevented from fully closing by a dashpot or like device associated with the throttle valve 22.

In the latter case, if the throttle valve 22 is closing under the control of the dashpot, the closure rate will be characteristic and fall in or below a predetermined range. Alternatively, if the engine is cold or the throttle position is arbitarily held open in response the use of an air conditioner, the throttle valve will not immediately assume a fully closed position and trigger the idle switch 28.

Accordingly, at steps 1002 and 1004 the rate at which the throttle valve 22 is changing position is ranged against first and second constants K1 and K2. If the outcome of step 1002 shows the rate to be below K1 then at step 1003 a pedal release flag is set indicating that the throttle valve can be assumed to possibly be closing under the control of the dashpot (for example). On the other hand, if step 1004 shows the rate to be in excess of K2 then it is assumed that the rate of movement is too high to be due to dashpot control or the like, and the program flows to step 1005 wherein a command to clear the pedal release flag is issued.

However, if the instant value of dTh is less than K2 then the program goes to step 1006 without setting (or clearing) a pedal release flag.

In summary steps 1002 to 1005 range the throttle position change rate and determine if the rate is in a predermined range of below the same. In the former case no flag is set, however, if the rate is sufficiently low then the possibility of dashpot control is sufficiently high to warrant the setting of flag indicative of the same.

At step 1006 the instant vehicle speed is sampled and compared with a predetermined minimum value Vspo.

If the speed is below the minimum requirement then the program goes directly to step 1010 wherein a command to de-energize the solenoid 18 is issued. Viz., as will be appreciated from FIG. 2 whenever the vehicle speed is equal to or below Vspo (i.e not greater than the same) it is desired to de-energize the solenoid irrespective of idle switch status.

Figure 2:
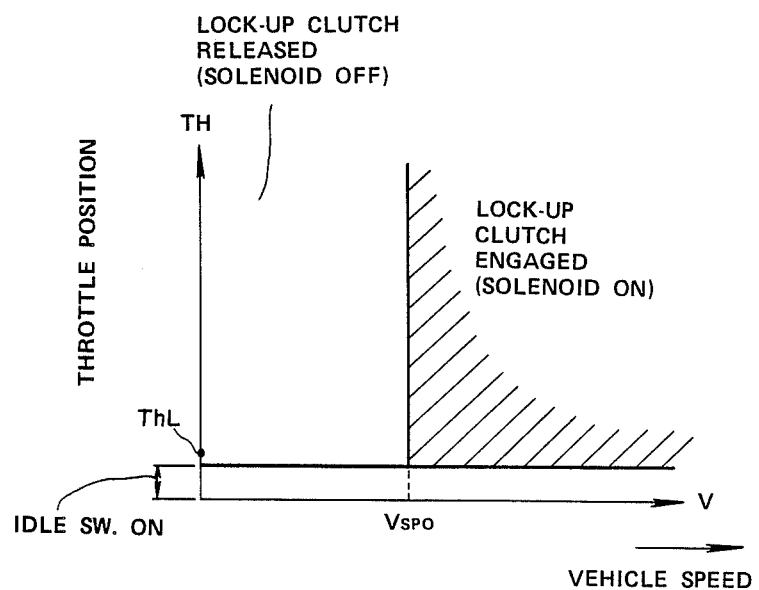
FIG. 2 is a chart showing the lock-up control characteristics provided with the embodiments of the present invention.

On the other hand, if the speed V is greater than Vspo then at step 1007 the instant status of the idle switch signal is sampled. If the switch 28 is ON the the program goes to step 1011 and thus ensures the control illustrated in FIG. 2 is provided. However, if the idle switch 28 is OFF, then at step 1008 the instant throttle position Th memorized in RAM in step 1001 is compared with a mimimum value ThL which is proximate the point at which the idle switch is triggered. If the throttle valve has not yet closed to this level then the program flows directly to step 1012 wherein a command to maintain the lock-up solenoid 18 in an energized state. However, if the instant value of Th is less than ThL then the program flows to step 1009 wherein the presence or absence of the pedal release flag is determined. If no flag has been set then it is decided that the conditions which demand the release of the lock-up clutch do not as yet exist and the program goes to step 1012 wherein a command which induces the energization of, or continues the instant energization of, the lock-up solenoid 18 is issued. However, at this point if a flag has been set then at step 1010 the absolute value of dTH is compared with a value K3.

Figure 4:
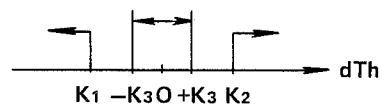
FIG. 4 is chart showing in terms of the change in throttle position, the ranges of constants used for determining the operation of the first embodiment.

This value as will be appreciated from FIG. 4 is such as to fall within the range of K1–K2 and in fact define a very narrow range which spans zero movement.

If the outcome of step 1010 is positive then it is assumed that the driver has in fact released the accelerator pedal.

However, if the outcome is negative then still the possiblity that the release of the lock-up clutch is premature exists and step 1012 is executed.

Following either of steps 1011 or 1012 the program recyles to step 1001 wherein fresh throttle position data is again sampled and duly recorded.

With the first embodiment the following merits are derived;

by monitoring the throttle position it is possible to anticipate a momentary closing of the idle switch and thus in effect detect a fully closed throttle condition in a manner which obviates the drawbacks wherein the actual closure of the idle switch, delayed by the provision of the dashpot or choke arrangement, induces the shuddering problem; and the ability to anticipate a fully closed throttle conditions provides a fail safe which guards against possible idle switch malfunction.

FIG. 5 shows a second embodiment of the present invention. This embodiment differs from the first in that, in step 2005, instead of comparing the instant dTh value against the constant K2, the instant throttle position TH is compared with a value THm+L.

In this instance THm denotes a variable which can be updated in accordance with the sensed throttle position TH. The value L is an arbitarily selected fixed value which is added to the THm value:

If the outcome of step 2005 is positive indicating that the instant value of TH is greater than THm+L, then at step 2006 idle and pedal release flags are cleared. Alternatively, if the outcome of step 2005 is negative the program flows to step 2007 without any of the two flag setting being modified.

In step 2004, in addition to the setting of a pedal release flag, the instant value of TH is set into RAM as the instant value of THm.

Steps 2007 to 2010 are essentially identical to steps 1006 to 1009 of the first embodiment. However, in this embodiment in the event of a positive outcome at step 2009 indicating that a pedal release flag has been set in step 2004, then at step 2010 the instant value of TH stored in RAM is compared with the current value of THm. In the event that TH is less than THm then at step 2012 the current value of THm is updated to correspond to the instant value of TH. Following this, at step 2013 the absolute value of dTH is compared with constant K3. If the value is less then at step 2014 an idle flag is set and the program goes on to step 2015.

On the other hand, if the instant value of TH is larger than THm at step 2011, then the program flows directly to step 2015 wherein current status of the idle flag is determined. If the idle flag has been set then the program goes to step 2017 wherein a command to de-energize the control solenoid 18 is issued.

However, if the idle flag has not been set then at step 2016 a command to energize the control solenoid 18 is issued.

This control routine produces essentially the same results as that used in the first embodiment.

It will be noted however, that the present invention is not limited to the use of a throttle position sensor and other sensors such as those responsive to induction pressure, accelerator pedal stroke, accelerator linkage stroke and the like can used if so desired. Viz., any sensor which produces a signal indicative of engine torque can be used with the present invention. It will be further noted that the present invention is not limited to arrangements which are equipped with an idle switch and can be readily applied to arrangements wherein such a switch is not provided.

The present invention is further not limited to the control of the lock-up clutch and can be applied to controlling the shifting of the transmission.

What is claimed is:

1. In a method of operating a system having a prime mover and a device associated with said prime mover, the steps of:
   sensing the load on said prime mover;
   determining the rate at which the load is changing;
   sensing if the rate at which load is changing is within a first range;
   sensing, in response to the rate being sensed as being within said first range, if the rate is within a second predetermined range which is narrower than said first range;
   issuing a control signal to said device in the event that the rate at which load on the prime mover is changing is sequentially sensed as being within said first and second ranges.

2. A method as claimed in claim 1 further comprising the steps of:
   sensing the load on the prime mover being within a predetermined low load range a minimum value of which corresponds to the minimum load to which the prime mover is subject;
   preventing the issuance of said control signal while the load on said prime mover is outside said low load range.

3. In a method of operating a system having a prime mover and a device associated with said prime mover, the steps of:
   sensing the torque produced by said prime mover;
   determining the rate at which the torque is changing;
   sensing if the rate at which torque is changing is within a first range;
   sensing, in response to the rate being sensed as being within said first range, if the rate is within a second predetermined range which is narrower than said first range;
   issuing a control signal to said device in the event that the rate at which torque on the prime mover is changing is sequentially sensed as being within said first and second ranges.

4. A method as claimed in claim 3 further comprising the steps of:
   sensing the torque on the prime mover being below a predetermined low torque value;
   preventing the issuance of said control signal while the torque on said prime mover is above said low torque value.

5. In a method of operating an automotive transmission having a torque converter and a lock-up clutch associated with the torque converter, said torque converter being operatively connected with a prime mover, the steps of:
   sensing a first parameter which is indicative of one of (a) the load on said prime mover and (b) the torque produced by said prime mover;
   determining the rate at which the first parameter is changing;
   sensing if the rate at which first parameter is changing is within a first range;
   sensing, in response to the rate being sensed as being within said first range, if the rate is within a second predetermined range which is narrower than said first range;
   issuing a control signal which releases said lock-up clutch in the event that the rate at which first parameter on the prime mover is changing is sequentially sequenced as being within said first and second ranges.

6. In a system having a prime mover and a device associated with said prime mover:
   means for sensing the load on said prime mover;
   means for determining the rate at which the load is changing;
   means for sensing if the rate at which load is changing is within a first range;
   means for sensing, in response to the rate being sensed as being within said first range, if the rate is within a second predetermined range which is narrower than said first range;
   means for issuing a control signal to said device in the event that the rate at which load on the prime mover is changing is sequentially sensed as being within said first and second ranges.

7. A system as claimed in claim 6 further comprising:
   means or sensing the load on the prime mover being within a predetermined low load range a minimum value of which corresponds to a minimum load to which the prime mover is subject;
   means for preventing the issuance of said control signal while the load on said prime mover is outside said low load range.

8. In a system having a prime mover and a device associated with said prime mover:
   means for sensing the torque produced by said prime mover;
   means for determining the rate at which the torque is changing;
   means for sensing if the rate at which torque is changing is within a first range;
   means for sensing, in response to the rate being sensed as being within said first range, if the rate is within a second predetermined range which is narrower than said first range;
   means for issuing a control signal to said device in the event that the rate at which torque on the prime mover is changing is sequentially sensed as being within said first and second ranges.

9. A system as claimed in claim 8 further comprising:
   means for sensing the torque on the prime mover being within a predetermined low torque range the minimum value of which corresponds to the minimum torque to which the prime mover is subject;
   means for preventing the issuance of said control signal while the torque on said prime mover is outside said low torque range.

10. In an automotive transmission having a torque converter and a lock-up clutch associated with the torque converter, said torque converter being operatively connected with a prime mover:
    means for sensing a first parameter which is indicative of one of (a) the load on said prime mover and (b) the torque produced by said prime mover;
    means for determining the rate at which the first parameter is changing;
    means for sensing if the rate at which first parameter is changing is within a first range;
    means for sensing, in response to the rate being sensed as being within said first range, if the rate is within a second predetermined range which is narrower than said first range;
    means for issuing a control signal which releases said lock-up clutch in the event that the rate at which first parameter on the prime mover is changing is sequentially sequenced as being within said first and second ranges.

11. In a system:

an internal combustion engine;

a transmission;

a clutch arrangement interconnecting said engine and said transmission, said clutch arrangement including a torque converter and a lock-up clutch; and a control arrangement for selectively controlling said lock-up clutch, said control arrangement comprising:

a sensor for sensing a parameter which varies with one of (a) the torque produced by said engine and (b) the load on said engine;

a sensor for sensing the rotational speed of said transmission;

a circuit responsive to said first and second sensors for selectively producing a lock-up control signal, said circuit including means for:

sensing the magnitude of said parameter;

determining the rate at which the parameter magnitude is changing;

sensing if the rate at which the parameter magnitude is changing is within a first range;

sensing, in response to the rate being sensed as being within said first range, if the rate is within a second predetermined range which is narrower than said first range;

issuing a control signal to the control arrangement which controls said lock-up clutch in the event that the rate at which the parameter magnitude is changing is sequentially sensed as being within said first and second ranges;

sensing the magnitude of said parameter being below a predetermined minimum value; and preventing the issuance of said control signal while the magnitude of said parameter is above said predetermined minimum value.

* * * * *